Aug. 24, 1965  L. HORN  3,201,998
SPACE SENSING DEVICE
Filed June 14, 1963  3 Sheets-Sheet 1

INVENTOR,
LEON HORN

Aug. 24, 1965  L. HORN  3,201,998
SPACE SENSING DEVICE
Filed June 14, 1963  3 Sheets-Sheet 2

INVENTOR:
Leon Horn
By: Harry M. Saragovitz, Edward J. Kelly,
Herbert Berl & J. P. Edgerton

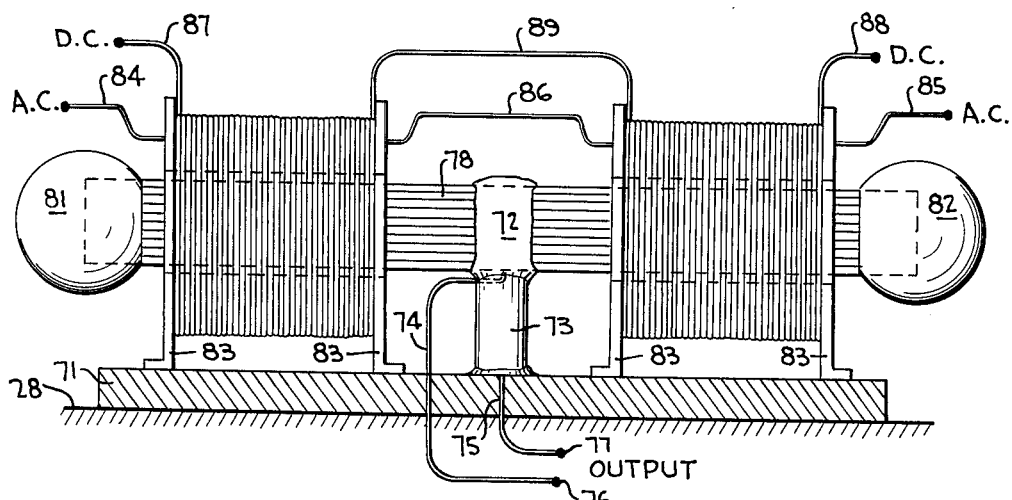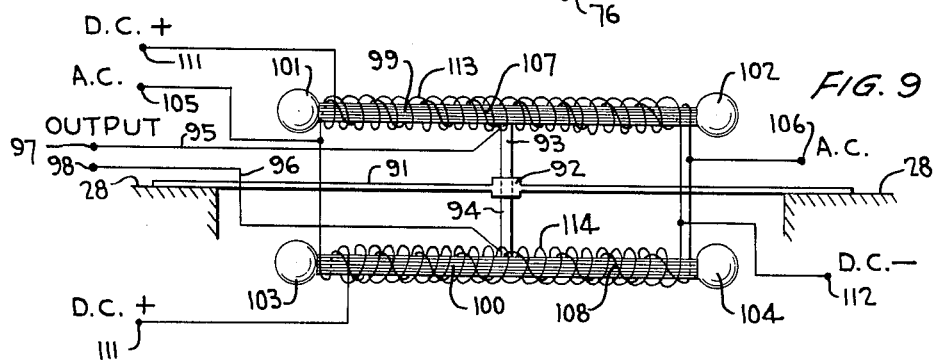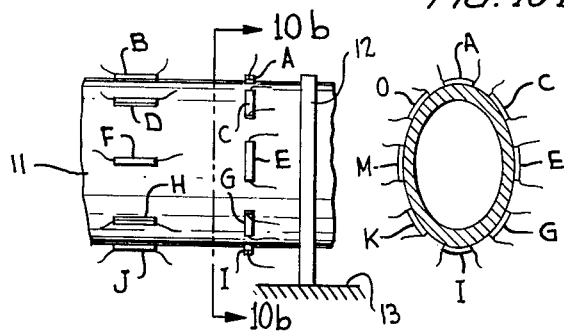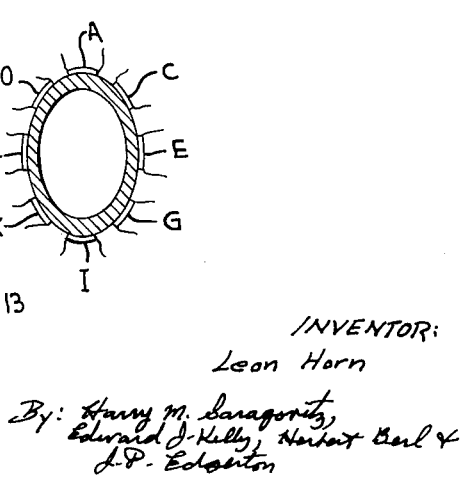

United States Patent Office 3,201,998
Patented Aug. 24, 1965

3,201,998
SPACE SENSING DEVICE
Leon Horn, Silver Spring, Md., assignor to the United States of America as represented by the Secretary of the Army
Filed June 14, 1963, Ser. No. 288,058
14 Claims. (Cl. 73—505)
(Granted under Title 35, U.S. Code (1952), sec. 266)

The invention described herein may be manufactured and used by or for the Government of the United States of America for governmental purposes without the payment to me of any royalty thereon.

This invention relates to magnetostrictive space sensing devices and, more particularly, to a non-magnetic compass.

Compasses are of two types: magnetic and non-magnetic. The magnetic compasses rely upon the magnetic field of the earth for direction referencing. The well known deficiencies of a magnetic compass include the separation of the true and the magnetic poles of the earth, the disturbances and irregularities in the magnetic field, the difficulty in calibration to eliminate the effects of the environment, and the recalibration required when a magnetic compass is placed in a new environment.

Prior non-magnetic compasses have been deficient in that the mass required for usable accuracy of gyroscopes is excessive and the expense of manufacture is high. In the prior non-magnetic compasses which utilize tuning forks, the circuitry for compensating the tuning fork requires extreme care to produce, the tuning fork is very difficult to balance, an excessive amount of bulk is required, and the usable outputs are derived from the base thereof. Further, the frequency range of operation of the tuning fork is in the audible or near audible range and is, as a result, sensitive to external vibration. The tuning fork base is sensitive to linear motion and, further, a tuning fork base has objectionable inherent secondary harmonics or modes of vibration. Other prior devices have employed piezo-electric crystal inertia members which are rotated at high velocity with a gyration disturbance force applied to provide a detectable angular movement response.

The magnetostrictive compass of this invention provides a reading of true north without the necessity of knowing the location of the compass on the earth. This means that no correction is required for latitude nor longitude any place on earth. A reading of a simple dial is sufficient to determine direction. Further, the compass of this invention is substantially insensitive to shock, it operates in the very high frequency range, above the audible range, employs a magnetostrictive element, and is comparatively inexpensive to build. Ambient noise signals are virtually self-eliminated and the output is, for all practical purposes, noise free and unambiguous.

Briefly, the invention of this disclosure is a magnetostrictive space sensing element that will give direction, magnitude and duration of an applied force. The conservation of angular momentum in a closed system and Newton's law that an object moving in a straight line tends to continue in that same straight line until acted upon by an external force are the basic principles utilized. A magnetostrictive element is symmetrically mounted about a support means on a base member. The magnetostrictive element is lengthened by a high frequency magnetic force and transducers are positioned at discrete locations thereon which provide output signals modulated by the bending of the magnetostrictive element upon application of a torque to the base member. The placement and discrete connection of the strain gauges provides for self-elimination of noise signals. The modulation is indicative of the direction, magnitude and duration of the torque applied to the base member. This device is sensitive to the torques produced by the rotation of the earth. The transducers are connected to a resistance bridge which provides a difference signal output to a discriminator which gives an output signal which is the resultant of the said modulation. A trigger circuit can be added to provide a trigger signal output when the modulation signal reaches a predetermined value.

It is, therefore, an object of this invention to provide a very efficient non-magnetic compass.

Another object of this invention is to provide a relatively inexpensive non-magnetic compass of small mass.

Still another object of this invention is to provide a non-magnetic compass employing a magnetostrictive element.

A still further object of this invention is to provide a non-magnetic compass which utilizes the law of conservation of angular momentum.

Another object of this invention is to provide a compass which is independent of environmental influences to the extent that recalibration for environmental conditions is unnecessary.

Still another object of this invention is to provide a non-magnetic compass in which the noise signals are substantially self-eliminated.

A further object of this invention is to provide a non-magnetic gyro capable of measuring linear as well as angular velocity.

The specific nature of the invention, as well as other objects, uses, and advantages thereof, will clearly appear from the following description and from the accompanying drawings, in which:

FIG. 4a is a cross sectional view of the tube 11 in FIG. 3, indicated therein by the arrows 4a.

FIG. 8 is a pictorial representation of a second embodiment of this invention.

FIG. 9 is a pictorial representation of a third embodiment of this invention.

FIG. 10a shows an alternate placement of transducers on the tube 11.

FIG. 10b is a cross sectional view of tube 11 in FIG. 10a as viewed in the direction of arrows 10b.

Figure 1:
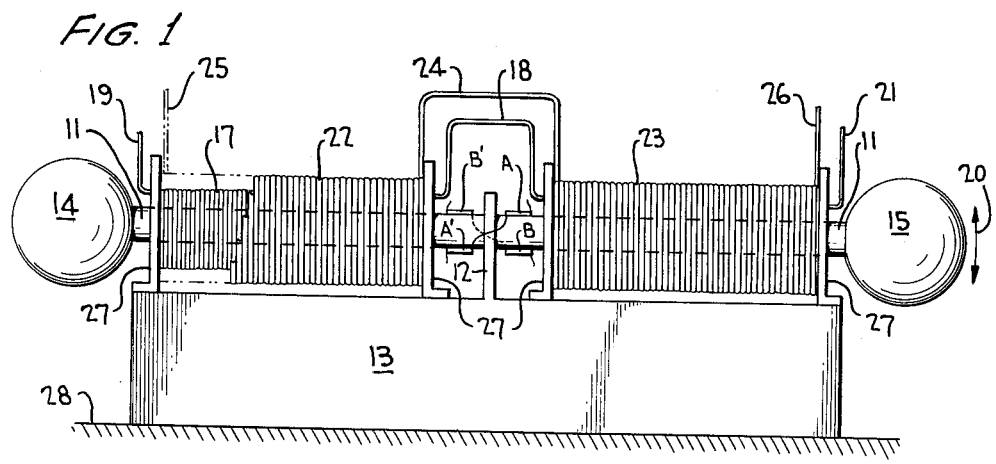
FIG. 1 is a pictorial representation of an embodiment of this invention.

Turning now to the drawings in which like elements have like numbers through the several figures, FIG. 1 shows a first embodiment of the invention of this disclosure. A magnetostrictive tube 11 is mounted symmetrically about a mounting means 12. The mounting means 12 is a part of a base means 13. The base means 13 is made of some high inertial material such as iron and is placed on or secured to the device 28 which the rotation thereof is measured from which orientation is determined. Iron in base 13 increases the efficiency of the system by providing a magnetic loop for the flux generated by the alternating current in winding 17. A first additional mass illustrated as a metal ball 14 is placed on the left end of the magnetostrictive tube 11, and a second additional mass illustrated as ball 15 is placed on the right end of the tube 11 as shown in FIG. 1. The balls 14 and 15 have the effect of moving the center of the total mass of the tube structure a maximum distance from the mounting means 12. The mass may be of any shape so long as its center of gravity is along the axis of the tube. The balls 14 and 15 are of non-magnetic materials.

Surrounding tube 11 is an alternating current winding 17. The winding 17 is constructed so that the inner area is larger than the area described by the motion of the magnetostrictive tube during its operation. The winding 17 is not contacted by the tube 11. Further, winding 17 is presented in two equal parts 17 and 170 (see FIG. 3) which are symmetrically disposed about the mounting means 12, the two halves thereof being connected by a connector 18. The alternating current power source is connected to winding 17, 170 through connectors 19 and 21.

A direct current winding having two halves 22 and 23 surrounds the alternating current winding 17, 170 and has a connecting means 24 between the two halves. A direct source is connected to the winding 22, 23 through connectors 25 and 26.

The direct current and alternating current windings are supported free of the magnetostrictive tube by suitable support means 27.

A plurality of strain gauges, such as A, A', B, B', E and F', are placed around the periphery of the magnetostrictive tube 11 on both sides of the mounting means 12. These strain gauges are discretely disposed in connected pairs with the strain gauges of each pair being on opposite sides of mounting means 12 and being diagonally disposed with respect to the tube 11. That is, the top strain gauge on the right of mounting means 12 is connected to the bottom strain gauge on the left of the mounting means 12. Such connected pairs are labeled A and A', B and B', C and C' and so on, with the primed letter being indicative of the strain gauge on the left of the mounting means 12 which is connected to the like letter unprimed on the right side of the mounting means.

Figure 2:
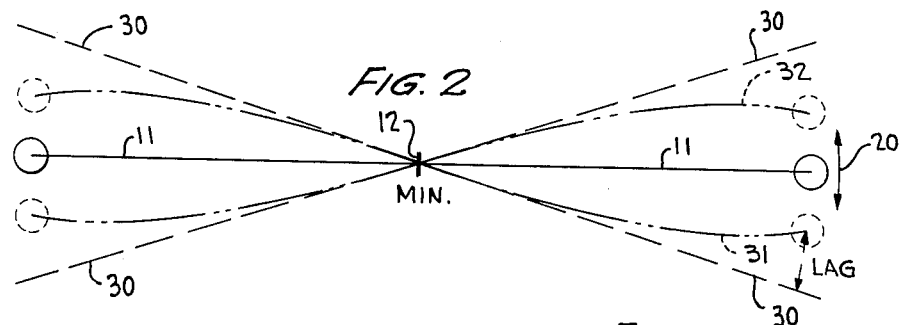
FIG. 2 is a graphic representation of the movement of the tube 11 shown in FIG. 1 as viewed from above.

FIG. 2 shows the configuration of the magnetostrictive tube 11 when base 13 is subjected to a torque with the axis of the base means 12 which is parallel to the tube 11 being the center of revolution. This torque is applied during the lengthening and the shortening of tube 11. It is seen that the maximum displacement of the tube is at the point furthest from the mounting means 12, and the minimum change is at the mounting means. This accounts for the placement of the strain gauges at the mounting means 12. The strain gauges are subjected to minimum movement and maximum stress. Curve 31 represents the shape of tube 11 as seen from the side as in FIG. 1 when the axis of base 13 is subjected to a rotation in one direction and curve 32 applies when the axis of base 13 is rotated in the opposite direction. The broken lines 30 represent the theoretical position of tube 11 if it were not distorted by conservation of angular momentum forces. The arrows 20 in FIGS. 1 and 2 show the relative motion of tube 11 in the two figures.

Figure 3:
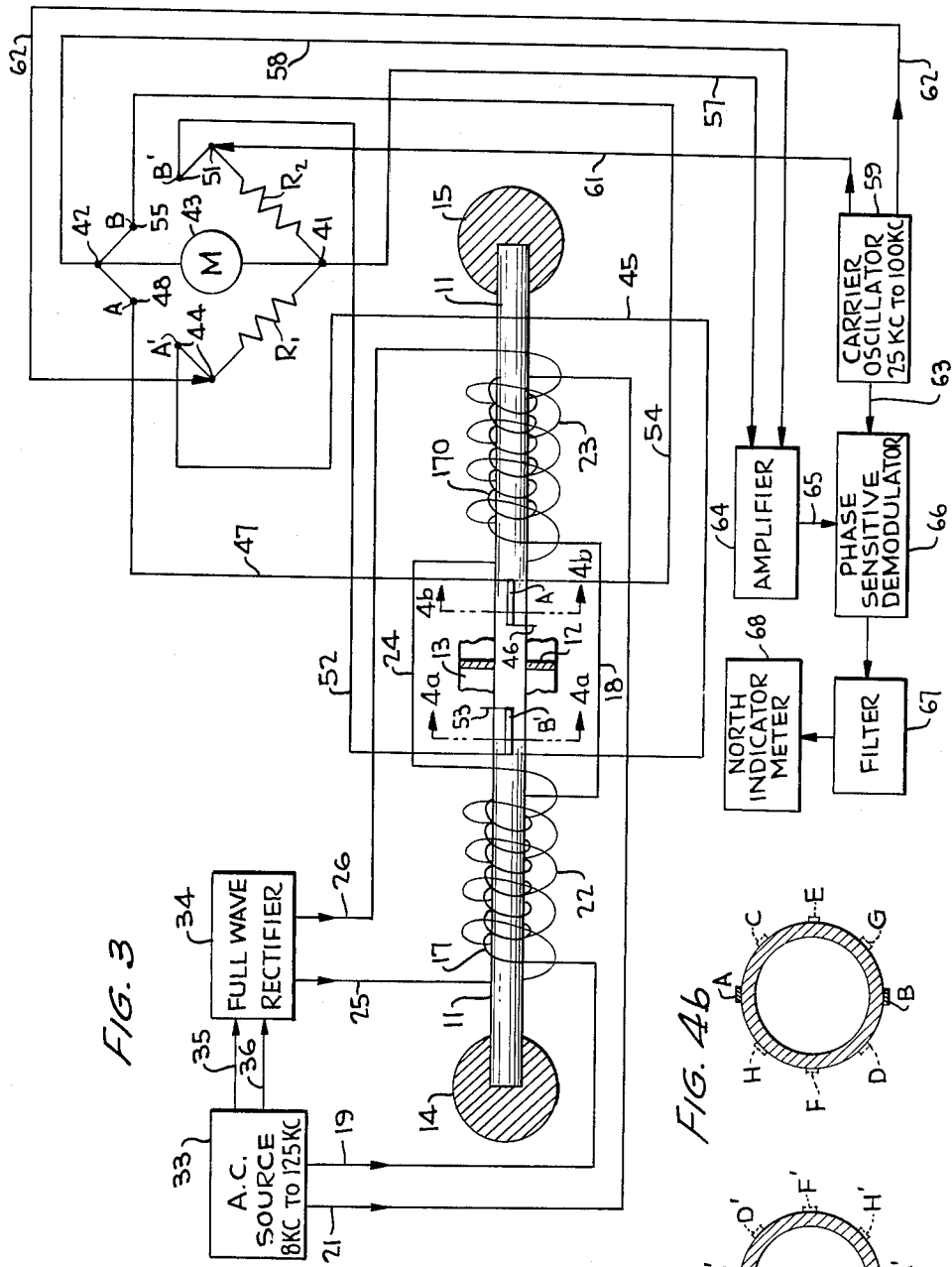
FIG. 3 is a combined schematic and block diagram of the circuitry employed in this invention.

FIG. 3 illustrates a system incorporating the magnetostrictive tube 11 mounted and constructed as shown in FIG. 1. FIG. 3 shows the tube 11 from above, a ninety degree change of perspective from the showing in FIG. 1. The mounting means 12 and the base means 13 are partially illustrated. An alternating current source 33 is provided and connectors 19 and 21 connect alternating current winding 17, 170 thereto. Also connected to the alternating current source 33 is a full wave rectifier 34 connected through leads 35 and 36. The pulsed direct current output from the full wave rectifier 34 is supplied through leads 25 and 26 to the direct current windings 22, 23. The windings about tube 11 are connected so as to provide simultaneous lengthening alternating with permitting simultaneous shortening of the two ends of the tube 11.

A resistance bridge circuit is provided with resistors $R_1$ and $R_2$ connected to a first terminal 41. Across terminal 41 and a second terminal 42 in the resistance bridge is connected a meter 43. Resistor $R_1$ is connected between terminal 41 and a third terminal 44 to which is also connected one end of a connecting means 45, the other end of which is connected to a first end of a strain gauge A', not shown since it is placed diagonally of strain gauge A, that is, exactly 180 degrees around the tube from the illustrated strain gauge B'. Gauge B' is symmetrically disposed on the left side of the mounting means 12 with gauge A on the right side thereof. Strain gauges B' and A are axially aligned and such axis is parallel to the axis of tube 11. Terminals 41 and 42 in the resistance bridge are also connected through resistor $R_2$, a fifth terminal 51, a sixth connector 52, a strain gauge B', a seventh connector 53, strain gauge B, not shown because of diametric disposition with respect to strain gauge B', and an eighth connector 54 and a sixth terminal 55. Terminals 41 and 42 also provide the desired information difference signal as the input to an amplifier 64 through ninth and tenth connectors 57 and 58, respectively. A carrier oscillator 59 is provided to produce a driving frequency for the resistance bridge and to sample the resistance changes of the strain gauges connected to the bridge. The driving frequency is applied through conductors 61 and 62 to terminals 44 and 51 which are on opposite arms of the bridge from the output arms 41 and 42. The carrier oscillator 59 is also connected through connector 63 as an input to a phase sensitive demodulator 66. The output of the amplifier 64 is fed through connector 65 as a second input to the phase sensitive demodulator 66, and the output of the phase sensitive demodulator 66 is passed through a filter 67 to an indicator means such as north indicator meter 68. Alternatively, the output of the filter 67 can be connected as an input to a servo system so as to utilize the information derived by this device to operate other systems in response thereto. Further, the circuitry can include a trigger circuit connected to the output of the filter 67. A null meter is connected to the trigger circuit. A negative bias can be applied to the trigger circuit so that a trigger output signal is provided only when the demodulated signal is in the negative, noise eliminated range. As a further alternative, if a meter is supplied of sufficient sensitivity, it would be possible to use a constant current power supply for the gauges and read true north directly from such meter at M43, and eliminate the circuitry shown in block form.

Figure 4B:
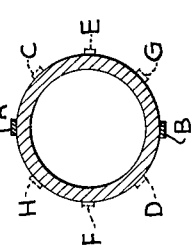
FIG. 4b is another cross sectional view of the tube 11 in FIG. 3 as viewed from the location indicated by the arrows 4b.
Figure 4A:
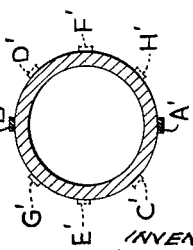

FIG. 4a shows a diametrically disposed placement of the strain gauges A' and B' on the tube 11 with the additional strain gauges C', D', E', F', G', and H' located around the periphery of the tube to provide a strain gauge at enough locations on the periphery to reveal any bending of the tube in any direction.

FIG. 4b shows the companion strain gauges which are paired with the strain gauges in FIG. 4a as well as their relative location on the tube 11. The companion strain gauges are located diametrically opposed to the strain gauges in FIG. 4a.

Figures 5, 6, 7:
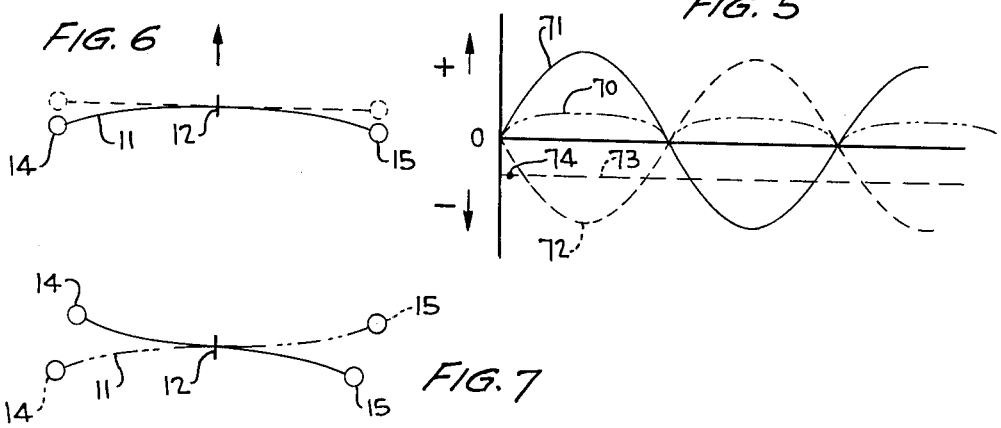
FIG. 5 is a graphic representation of the outputs of the transducer pairs in FIG. 1.
FIG. 6 is a representation of the movement of the tube 11 when a non-rotative force is applied to the support in a direction which is normal to the tube.
FIG. 7 is a representation of the movement of the tube 11 when a rotative force is applied to the support thereof.

FIG. 5 is a graphic representation of the simultaneous outputs of strain gauges A, A' by sine wave 71 and the strain gauges B, B' by the minus sine wave 72. The negative line 73 is representative of the negative bias provided when triggering of the circuit is desired at some positive value of the difference signal of the bridge circuit output. The zero line represents the difference signal of the outputs of the two strain gauges pairs represented by the curves 71 and 72. This means that the signals from the pairs are self cancelling when there is no torque applied to the tube 11. The application of the bias voltage would actually lower the difference signal toward the bias line 73 but not enough to trigger an output signal. With negative bias applied, only a positive difference signal has significance. When a trigger circuit is incorporated in the system between the filter circuit and the meter, several difference signals are averaged before the root-mean-square trigger is set. When the difference signal is of the magnitude of the signal represented by the line 70 in FIG. 5, for example, the trigger will supply an output signal. The negative, ineffective signals are ignored and the noise is thereby reduced. When the difference signal is subjected to the bias voltage and the average resultant signal is at a point such as 74 at the bias level, for example, the trigger can be set to fire.

FIG. 6 shows the distortion of the magnetostrictive tube 11 when the base 13 with the mounting means 12 are moved in a direction perpendicular to the tube. The masses 14 and 15 are seen to lag behind the mounting means 12 and tube 11 bends so that the center part leads the rest of the tube. This means that the outputs of the paired strain gauges is such that the difference thereof is zero and that a force that is not rotational is ineffective and that the sensing device is sensitive only to rotational forces.

FIG. 7 shows the distortion of the magnetostrictive tube 11 when the base 13 with the mounting means 12 are moved in a clockwise direction with the mounting means 12 being the center of rotation. This shows that strain gauge pairs will have different outputs since the strain gauge of a pair is distorted in the same way that the other strain gauge of that pair is distorted, and the stress and strain to which the strain gauge pairs are subjected are different for each pair.

FIG. 8 shows a second embodiment of the invention of this disclosure. Secured to a base means 71 is a mounting means 72. Base means 71 is placed on the earth or an element 28 which is fixed or moving with respect to the earth. Surrounding a portion of mounting means 72 is a piezoelectric transducer 73 made of ceramic material or the like. Stresses within the transducer 73 provides an output signal through leads 74 and 75 to terminals 76 and 77. A magnetostrictive bar 78 is rigidly supported at its center of symmetry by mounting means 72. Bar 78 is supported at no place other than its center of symmetry. A first concentrated mass 81 is added to the left end of bar 78 as shown in FIG. 8 and a second concentrated mass 82 is added to the right end of the bar 78 in order to shift the center of gravity of the two halves of bar 78 as far from mounting means 72 as practical. The bar 78 is laminated having a plurality of slabs of magnetostrictive material secured together to make an elongated laminated bar. The bar 78 is laminated to cut down eddy currents for high frequencies and to provide a non-uniform degree of flexibility so that cross-axis sensitivity can be reduced.

Also connected to the base means 71 are winding support means 83 which hold the alternating current and the direct current windings which surround the two halves of the bar 78 out of engagement with bar 78. The alternating current windings are connected to an alternating current source through connectors 84 and 85 and to each other through connector 86. The direct current windings are conected to a direct current source through connectors 87 and 88 and to each other through connector 89.

FIG. 9 illustrates a third embodiment of the invention. The device 28 concerning which the embodiment gives directional information is shown with a base means 91 secured at both ends to two places on device 28. A mounting means 92 which is a part of the base means 91 has connected thereto further mounting means which are surrounded by piezoelectric transducers 93 and 94. Transducers 93 and 94 may be of ceramic material or other suitable semiconductive material. The transducers 93 and 94 are symmetrically disposed on either side of the mounting means 92. Transducer output signals are presented through connectors 95 and 96 to output terminals 97 and 98, respectively. A pair of laminated magnetostrictive bars 99 and 100 are mounted on each end of the mounting means which is surrounded by transducers 93 and 94. Bar 99 is mounted at its center of symmetry with additional mass 101 on one end thereof and additional mass 102 on the other end thereof. Bar 100 is mounted at its center of symmetry with additional mass 103 on one end thereof and additional mass 104 on the other end thereof. Bars 99 and 100 are parallel with respect to each other and they lie in the same plane as the support means 91 and 92.

Terminals 105 and 106 are connected to an alternating current source, to winding 107 which surrounds but does not touch magnetostrictive bar 99 and to winding 108 which surrounds but does not touch magnetostrictive bar 100. Windings 107 and 108 are connected in such a manner that the electrical phase in both sections is the same.

Terminal 111 is connected to the positive side of a direct current source and to one end of each of the direct current windings 113 and 114. Terminal 112 is connected to the negative side of the direct current source and to the other end of each of the direct current windings 113 and 114. The direct current windings are connected in such a manner as to assure that both sections create magnetic fields in opposition to each other.

FIG. 10a shows an alternate orientation of strain gauges so as to provide signals indicative of any deformation of the circular cross-section of the tube 11 and, therefore, any stresses set up in the tube. Strain gauges A, C, E, G, I, K, M and O are equally spaced with their longest dimension aligned along a circumference of tube 11, as in FIG. 10b, very near the mounting means 12 where the tube distortion is a maximum. A second group of the strain gauges, that is, B, D, F, H, J, L, N and P are located on the side of the first half of the strain gauges away from the mounting means. The long dimension of the second half is perpendicularly disposed with respect to the first group of strain gauges and parallel to the axis of the tube in a circle around the tube. A third group of strain gauges, not shown, is symmetric with respect to the mounting means to the first group and a fourth group is symmetric to the second group. The gauges of the third and fourth groups are numbered symmetrically with their counterparts in the first and second groups and are primed to indicate that they occur on the right hand side of the mounting means as shown in FIG. 10a. That is, the top gauge in group three would be A', the bottom one I' and so on.

FIG. 10a shows the magnetostrictive tube 11 distorted from a circular cross-section to an elliptical cross-section when the tube is bent, as occurs during the application of a torque thereto. The varied distortion of the several strain gauges shows that varied output signals from the several strain gauges would reveal exactly in which plane the distortion occurs. With the plurality of strain gauges, it is possible to detect rotational forces on the base of the device and linear forces as well. That is, the sensitive-to-the-vertical oriented gauges, such as A, A', B, B', I, I', J and J' are sensitive to rotational forces on the base 13 of the device and the horizontally oriented gauges, such as E, E', F, F', M, M', N and N' are sensitive to linear forces on the base 13.

In the operation of the embodiment of the device as shown in FIGS. 1 and 3, the magnetostrictive rotation sensing device having a base 13 is placed on a moving object 28 and, therefore, moves the same as the moving object. The moving object 28 can be the earth or a moving vehicle. When the object 28 is the earth, the device works as a compass in the following manner.

The device effectively rotates about the longitudinal axis in the center of tube 11. This axis of rotation is perpendicular to the velocity vector of the earth and parallel to the surface of the earth, that is, along a line of longitude. Even though the device is disposed in any direction in the plane parallel to the surface of the earth, the axis of rotation remains relatively fixed about an axis within the tube that is along a line of longitude. It is the relationship between this axis of rotation and the longitudinal axis of the tube 11 that provides the detectable output variation which is utilized by this invention. The plane of rotation of the balls, in response to the angular forces applied to base 13, is vertical with respect to the earth.

When tube 11 is lengthened and then shortens at a high frequency, with tube 11 oriented so that its longitudinal axis is perpendicular to the velocity vector of the earth, there is no distortion of the tube 11 since the effects of lengthening of the tube 11 perpendicular to the velocity vector does not effect the rotational radius of the masses 14 and 15. The stresses set up in both halves of the tube 11 are the same and the strain gauge pairs will give no difference output signal. Tube 11 is positioned so as to, effectively, rotate about its own longitudinal axis. It is seen that true north is in the direction of the axis of the tube when the difference output of the strain gauge pairs is at a minimum. The signal to noise ratio is such as to render a minimum as the desirable level for indication of true north rather than a maximum since it is possible to get false maxima due to mechanical unbalance. No false zero minimum is possible because all differences appear as positive values and no differences less than zero exist in the system.

The maximum difference output of the strain gauge pairs occurs when the axis of the magnetostrictive tube 11 is aligned with the velocity vector of the earth, that is, parallel to a line of latitude. This maximum occurs when the tube 11 is distorted a maximum amount. Such maximum distortion is the result of the action of the conservation of angular momentum. As the tube 11 is lengthened, both balls 14 and 15 move away outwardly from the center mounting means 12 resulting with alteration of the rotational radii of the balls. The outward movement of ball 14 causes the ball to slow down. This retardation results from the requirement of a change of angular velocity to conserve angular momentum. Since the tube is being lengthened, the velocity of the moving mass becomes less than the velocity of the base and the tube will become bent. Since angular momentum is conserved, the mass of the ball is unchanged and the tube is lengthened, the rate of rotation of the ball with respect to the base must alter, that is, speed up or slow down. It will speed up when the tube is shortened and slow down when the tube is lengthened. When the tube length increasing force terminates, the tube shortens and the balls are moved closer to the mounting means and, since the angular momentum is conserved, the angular velocity of the balls must increase. Since the axis about which the tube 11 is rotating is effectively about an axis at the center of tube 11 as set forth above, the plane of rotation of tube 11 is vertical with respect to the earth and the balls will move from or toward the center of the earth as the angular velocity of the balls decreases or increases. This would cause the ball to lead if moving toward the west or lag if moving toward the east in the plane of rotation, vertical plane that is, and the tube 11 would assume the serpentine configuration shown in FIG. 7. The dotted line in FIG. 7 illustrates a lag and the solid line indicates a lead.

In the structure that includes one arm of the magnetostrictive tube 11 secured at means 12 and having a mass, such as ball 14, attached thereto, the natural frequency $\omega_N$ of a flexing arm is found to be:

$$\omega_N{}^2 = \frac{3K}{2mL_0{}^3} + \frac{Z^2}{2}$$

and this depends upon a term of the rotation, i.e., Z.

where

K is the spring constant of the bar,
$m$ is the mass of the ball and the tube assembly concentrated at a point,
$L_0$ is the distance that the ball is from the center of rotation, and
Z is the angular velocity of the base 13.

The flex angle $$\phi = 2\frac{\frac{L_1}{L_0} \cdot I_0}{B_0} \cdot Z$$

where $L_1$ is the elongated length of the tube,
$L_0$ is the at-rest length of the tube, and
$L_1/L_0$ is the ratio of the original length to the extended length,
$I_0$ is the moment of inertia of the system about its center of rotation,
Z is the angular velocity of the base of the device and
$B_0$ is the damping coefficient of flexing of the tube.

Strain gauges, in measuring the flex angle, reveal the sense of rotation of the balls because, when they are leading during the elongation of the tube, for example, and lagging during the shortening of the tube, the direction of rotation is revealed. When there is no output difference signal from the strain gauge pairs, the longitudinal axis of the tube is aligned toward true north.

When a null is given at every direction in the plane of operation of the device as a compass, the device is at either the north or the south pole. It is also true that when the device is also measuring Coriolis forces at right angles to this, the strain gauges at right angles to the compass strain gauges will be showing maximum absolute torque.

When the device is utilized to measure the angular velocity of any object other than that of the earth, the response of the system to the directional and force changes on the base 13, an inertial body, reveals acceleration, thrust, direction and duration of forces applied thereto.

Turning now to the circuitry of this invention, and more particularly to FIG. 3, it is seen that the elongation of the tube 11 of magnetomotive material is accomplished by the alternating current from source 33 being applied through windings 17 and 170 to simultaneously elongate both ends of tube 11. The output of the full wave rectifier 34 is applied through windings 22 and 23 to cancel the negative half, for example, of the alternating current cycle so that once elongated, the tube 11 is free to return to its natural length without any magnetic force applied thereto. The output of the full wave rectifier also adds to the positive half of the alternating current cycle to double the magnetic forces applied to the magnetostrictive tube. The alternating current source 33 supplies a frequency of from eight thousand cycles per second to one hundred twenty five thousand cycles per second so as to match the resonance flex frequency of the tube. The strain gauges A, A', B and B' are located so as to detect flexure of the tube in response to an angular velocity applied to the base 13.

The input circuit for the compass system is an alternating current bridge which includes resistors $R_1$ and $R_2$ with the external semiconductor strain gauge pairs A, A' and B, B' as two active arms. The strain gauges are stress sensitive with resistance changes that are proportional to the stresses applied thereto. Excitation voltage from the carrier oscillator 59 for the bridge is more than 6 times higher than the natural resonance of the magnetostrictive oscillator so as to avoid harmonics and the like.

In operation, the bridge circuit modulates the carrier frequency in accordance with the bridge unbalance produced by a torque on the arms of the vibrating tube. Under no torque signal conditions, the bridge is dynamically and statically balanced and the carrier is suppressed. The amplitude of the output signal from the bridge is determined by the amount of unbalance. The phase of the output is determined by the direction and type of unbalance, resistive or reactive, and the bridge produces suppressed-carrier amplitude modulation. The carrier frequency provides for sampling of the strain gauge resistance changes at least, for example, ten times per oscillation of the tube to avoid harmonics and other side effects.

The modulator sidebands from the bridge circuit are applied to an alternating current coupled amplifier 64 where the desired side bands are amplified while unwanted frequencies are rejected by filtering.

The amplifier modulation sidebands are applied to a phase sensitive demodulator 66. In the demodulator 66 an artificial carrier is added to the side bands. A phase shifting network between the oscillator and the demodulator assures that the carrier is added in the proper phase. The added carrier insures that only the desired phase will be demodulated.

The output of the demodulator is then ready to be filtered by a special network 67 where the unwanted modulation components can be eliminated. The output from the filters 67 can be applied to a trigger circuit to cause a meter 68 to show maximum-minimum or "true" north as set.

The output from the filter can be applied to an oscilloscope to show the change applied to the A.C. input circuit by the strain sensitive arms. The output can also be applied as an input to a mechanism, such as a servo system, to provide corrective action in accordance with such signal change.

An example of the circuitry that can be incorporated into this system to carry out the functions of the carrier oscillator 59, the amplifier 64, the phase sensitive demodulator 66 and the filter 67 is a type Q plug-in strain gauge circuit manufactured by the Techtronic Oscilloscope Company for incorporating in their oscilloscopes.

The placement of the strain gauges as shown in FIGS. 4a and 4b provides a sufficient coverage by gauges to reveal two dimensional distortion of the tube that the gauges are mounted on regardless of the orientation of the tube.

The operation of the embodiment shown in FIG. 8 differs from the operation of the embodiment shown in FIGS. 1 and 3 in that the lamination of the bar 78 limits the movement of the bar to the vertical plane and the semiconductor transducer 73 which surrounds the securing means 72 is sensitive to any movement of the bar 78. Bar 78 is subjected to flexures and twists because of this form of mounting. In order to cancel the flexure signals without cancelling the twist signals whereby torsion can be read, it is only necessary to replace the piezoelectric transducer (a driving device) 73 with strain gauges (driven devices) which are disposed at 45 degree angles to the point of junction of the bar 78 and the mounting means 72 and to provide support means 72 with a tubular configuration on which to mount the gauges. This would mean that the gauges would be on the surface of the mounting means 72 which is revealed in FIG. 8 with the outer ends of such gauges being in the vicinity of the bottom edges of the bar 78 at support means 72 and their inner ends being near each other in perpendicular relation. The gauges paired with these perpendicular gauges would be likewise oriented on the back, not shown, surface symmetrical with the front gauges. The connections would be such that diagonally disposed pairs would be connected in series. These pairs then would become the parts of two of the arms of the bridge circuit as in FIG. 3. This arrangement of strain gauges would cancel flexures but not twist and, as a result, would read torsion and use the same techniques as in FIG. 3.

For FIG. 9, this embodiment of the invention is a rate gyro which measures the rotation of the moving object 28 on which the gyro is placed. This rotation must be about the axis of the support within the semiconductor transducers 93 and 94 in order to obtain a meaningful output. Rotation about an axis through one of the laminated bars 99 and 100 would give a zero output since these are axes of rotation for the system. With the electrical connections as shown, bar 99 is lengthened and shortens out of phase with bar 100, that is, while one is being lengthened, the other is shortening. This out of phase driving enables the gyro to be non-rigidly suspended, such as in cotton. The out-of-phase operation of the two bars enables the output of the transducers to indicate a torque to be set up in the section connecting the two bars which is proportional to the velocity of rotation. FIG. 9 could also have substituted a tube and paired strain gauges as discussed for FIG. 8.

In FIGS. 10a and 10b is shown an alternative orientation of the strain gauges wherein total information of the stresses within a tube can be obtained. With the individual strain gauges connected as inputs to a computer, with the computer connecting and sampling various pairs of strain gauges, the computer can read out effects, duration and magnitudes of linear and rotational forces and establish the planes in which such forces occur. When the tube 11 is bent along its axis, the cross-sectional configuration thereof becomes elliptical. The strain gauges A and I at the ends of the major axis as illustrated in FIG. 10b are compressed while gauges E and M on the minor axis are elongated. The remaining gauges C, G, K and O to detect the stresses anywhere along the circumference of the tube. This information, combined with the information derived by the primed strain gauges on the right side of mounting means 12 (not shown), reveals the degree, duration and direction of any force applied to the center of the magnetostrictive tube 11, whether linear or rotational. This is regardless of environment—on earth, in space, on a ship, a vehicle, etc. When gauges F and F' sets show elongation while N and N' show compression and A and A' and I and I' are neutral (no change) this is the circumstance that is defined by a linear force applied to the base 13 in the direction from gauge F toward N. When strain gauges F and N show the same elongation while F' and N' show compression, they are matched for rotational signals similar to the pairing of gauges in FIG. 3 while the gauges that are perpendicular to the axis of the tube 11 when diagonally paired show the same as in linear force read out. In addition, the gauges F, F', E and E' are showing torsional modes due to the fact that when F and F' show elongation while N and N' show compression and A, A', I and I' show elongation and E, E', M and M' show compression, the bar is experiencing a linear thrust from F toward N.

For three dimensional operation, it is necessary that two tubes 11 be furnished with strain gauges similarly disposed thereon and the axis of the two tubes being perpendicular to each other and in parallel planes. One set of strain gauges on one tube will be redundant with similarly placed strain gauges on the other tube.

In FIG. 10a, when the rotation of the earth is being detected by the device, gauges B and J' and B and J are coupled as in FIG. 3, that is, diagonally disposed pairs are coupled together. In addition, F and N' and F' and N are coupled to show Coriolis forces, the amount of which reveals latitude. In addition, sets A, C, E, G, I, K, M, O and their primed counterparts will determine by the shape of the tube, elliptical or not as in FIG. 10b, the actual direction and duration of the thrust.

This instrument requires consecutive sampling of all strain gauges continuously and four major types of bridge systems since the balance comparisons are different for each type of motion.

It is seen that I have provided a very efficient non-magnetic compass of small bulk which has a high degree of accuracy. The applied forces effect changes that are readily detectable and usable. It is inherent within the system to be able to discriminate between angular and linear forces. Further, the readout signal is not coupled to the driving signal, there is no electrical-mass coupling and the driving signal is not the signal detected by the strain gauges. The bridge circuit cancels the driving signal and there is electrical self-cancellation capability within the bridge. Noise is eliminated by the use of a zero minimum triggering level in the system.

In summation, the following statements are made.

A magnetostrictive space sensing element that will give direction, magnitude and duration of applied force, the invention consists of making use of a number of known factors in a new way.

1st. Newton's law: An object moving in a straight line tends to continue in that direction until the application of an external force.

2nd. A circular tube when bent will distort so that its cross-section will form an elliptic with the major axis normal to the direction of bending (the plane of bending).

3rd. The two opposing sides of the elliptic will show elongation on the one and compression on the other with reference to the long axis of the tube.

4th. A magnetostrictive rod will change its length under the influence of a magnetic field.

5th. Angular momentum in a closed system is conserved.

The magnetostrictive force on the rod will cause the mass to move back and forth in a straight line. Rotation in any plane except around the axis of the rod will react as torsion on the rod tending to bend the rod, i.e., deform the shape.

Normally, the strain gauges, which are placed in sets at opposite sides of the diameter of the rod will cancel each other. That is, adjusted to cancel if the magnitudes are the same. However, for side thrust, the rod is no longer circular because although the ball tends to continue in the same straight line, the base and the platform have rotated. The pair that gives the maximum output indicates the direction of the thrust. The output will show pulses, the magnitude and duration will be a measure of the time and force involved.

Such a system will also respond to a constant force by showing a constant force by showing a constant directional distortion or bias of the rod. The vibrating mass has additional resistance to change of direction and the resistance to rotational moment is a function of its position. That is, distance from the support. Hence the output will be dynamic and vary between a maximum and a minimum per pulse of the magnetostrictive signal.

The actual transducers used to measure the output might be semiconductors units which have gauge factors of over 100 and will greatly increase the available output.

Mounting in pairs in opposition takes care of temperature and null calibration beyond matching up units at zero field.

As a rate measuring device for rotational measurements, the device will give a pulsated output that is essentially the Coriolis acceleration.

Another way of looking at it would be by conservation of angular momentum. The unit would try to slow down and speed up as per position of the large mass with respect to the center of rotation. Actual movements would be small, hence one could expect the output to be linear.

The plane of vibration should be coincident with the axis of the mass of symmetry of the entire structure in order to avoid inclusion of extra vibrational sensitivities.

It will be apparent that the embodiments shown are only exemplary and that various modifications can be made in construction and arrangement within the scope of the invention as defined in the appended claims.

I claim as my invention:

1. A space sensing device comprising:
    (a) a flexible elongated magnetostrictive element,
    (b) first and second identical masses of non-magnetic material fixedly attached to the ends of said magnetostrictive element,
    (c) a support member,
    (d) means for rigidly mounting said magnetostrictive element at a point equidistant from its ends to said support member in a position that permits free angular vibration of said first and second masses about said equidistant point as a center,
    (e) means for producing a periodical pulsed magnetic driving signal having a frequency equal to the mechanical resonant frequency of the structure consisting of said first and second masses and said magnetostrictive element, which signal acts on said magnetostrictive element to produce a linear vibration of alternate elongations and relaxations of said magnetostrictive element along its major axis, said means for producing a periodic pulsed magnetic driving signal including:
        (1) a first mechanical winding disposed about but not contacting said magnetostrictive element between said first mass and said means for rigidly mounting,
        (2) a second electrical winding wound in a direction opposite that of said first electrical winding, said second electrical winding being connected in series with said first electrical winding and disposed about but not contacting said magnetostrictive element between said second mass and said means for rigidly mounting,
        (3) a third electrical winding concentric with said first electrical winding but not contacting said magnetostrictive element,
        (4) a fourth electrical winding wound in a direction opposite that of said third electrical winding, said fourth electrical winding being connected in series with said third electrical winding and concentric with said third electrical winding but not contacting said magnetostrictive element,
        (5) a source of alternating voltage connected in series with said first and second electrical windings, and
        (6) a full-wave rectifier having its input connected to said source of alternating voltage and its output connected in series with said third and fourth electrical windings whereby the magnetic flux generated in said first and second windings is reinforced by the magnetic flux generated in said third and fourth windings during one-half the period of the alternating voltage and is cancelled by the magnetic flux generated in said third and fourth windings during the other half of the period,
    (f) means for detecting the stresses to which said magnetostrictive element is subjected by the angular vibration of said first and second masses caused by movement of said space sensing device, and
    (g) means connected to and responsive to said means for detecting for providing an indication of the movement of said sensing device.

2. A space sensing device as set forth in claim 1 wherein said magnetostrictive element consists of a plurality of parallel laminates of magnetostrictive material running the length of said element and the planes of which are perpendicular to said means for rigidly mounting thereby permitting angular vibration of said first and second masses only in the plane perpendicular to the planes of said laminates in which the major axis of said magnetostrictive element lies.

3. A space sensing device as set forth in claim 2 wherein said means for detecting is a piezoelectric transducer and is a part of said means for rigidly mounting, said piezoelectric transducer being responsive to the strains of said magnetostrictive element caused by the angular vibration of said first and second masses to produce electrical signals proportional to said strains.

4. A space sensing device as set forth in claim 2 wherein said means for detecting comprises two pairs of strain gauges, the strain gauges of each pair being disposed at right angles each to the other and attached to said means for rigidly mounting positioned diagonally with respect to said magnetostrictive element with one end of each gauge being located at separate points adjacent the junction of said magnetostrictive element and said means for rigidly mounting, said strain gauges being responsive to the strains of said magnetostrictive element caused by the angular vibration of said first and second masses to produce electrical signals proportional to said strains.

5. A space sensing device as set forth in claim 4 wherein the strain gauges of each pair have a common junction and said means for providing an indication comprises:
  (a) a first resistor connected in series with one of said pairs of strain gauges,
  (b) a second resistor connected in series with the other of said pairs of strain gauges, said series connected resistor and strain gauge pairs being electrically connected in parallel to form a Wheatstone bridge of which the resistive branches are connected at a first common junction and the strain gauge branches are connected at a second common junction,
  (c) a source of voltage connected across the junction of said first resistor with the one strain gauge pair and the junction of said second resistor with the other strain gauge pair, and
  (d) means for indicating a voltage unbalance across the first and second common junctions of said Wheatstone bridge.

6. A space sensing device as set forth in claim 5 wherein said source of voltage comprises an oscillator which provides an alternating voltage signal across the junctions of said resistors with said strain gauge pairs and wherein said means for indicating comprises:
  (a) an amplifier connected across the first and second common junctions of said Wheatstone bridge,
  (b) a phase sensitive demodulator connected to receive as inputs the output of said amplifier and a signal from said oscillator, and
  (c) means for providing a visual display of the output of said phase sensitive demodulator.

7. A space sensing device as set forth in claim 1 wherein said magnetostrictive element consists of a thin-walled, hollow, cylindrical tube of magnetostrictive material.

8. A space sensing device as set forth in claim 7 wherein said means for detecting comprises:
  (a) a first plurality of strain gauges even in number attached to and uniformly arranged about the periphery of said magnetostrictive element adjacent to and on one side of said means for rigidly mounting to detect flexing and twisting of said magnetostrictive element along its major axis, and
  (b) a second plurality of strain gauges the number of which is equal to the number of said first plurality, said second plurality of strain gauges being attached to and uniformly arranged about the periphery of said magnetostrictive element adjacent to and on the other side of said means for rigidly mounting to detect flexing and twisting of said magnetostrictive element along its major axis, each of said strain gauges of said second plurality being positioned on a diagonal line passing through the major axis of said magnetostrictive element to a corresponding strain gauge of said first plurality.

9. A space sensing device as set forth in claim 8 wherein corresponding diagonally disposed strain gauges of said first and second pluralities are electrically connected in series and said means for providing an indication comprises:
  (a) a plurality of resistors equal in number to said first plurality of strain gauges, each of said resistors being electrically connected in series with one of the series connected strain gauge pairs and each of the series connected resistor and strain gauge pairs being electrically connected in parallel with a corresponding series connected resistor and strain gauge pair having diametrically opposed strain gauges to form a Wheatstone bridge of which the resistive branches are connected at a first common junction and the strain gauge branches are connected at a second common junction,
  (b) a source of voltage connected across the junctions of said resistors and the series connected strain gauge pairs in the Wheatstone bridges, and
  (c) means for indicating the voltage unbalance across the first and second common junctions of said Wheatstone bridges.

10. A space sensing device as set forth in claim 9 wherein said source of voltage comprises an oscillator which provides an alternating voltage signal across the junctions of said resistors and the series connected strain gauge pairs in the Wheatstone bridges and wherein said means for indicating comprises:
  (a) means connected across said first and second common junctions of said Wheatstone bridges for amplifying the voltage unbalance therebetween,
  (b) a phase sensitive demodulator connected to receive as inputs the output of said means for amplifying and a signal from said oscillator, and
  (c) means for providing a visual display of the output of said phase sensitive demodulator.

11. A space sensing device as set forth in claim 8 wherein said means for detecting further comprises:
  (a) a third plurality of strain gauges even in number attached to and uniformly arranged about the periphery of said magnetostrictive element adjacent to and on one side of said means for rigidly mounting to detect cross-sectional distortion of said magnetostrictive element, and
  (b) a fourth plurality of strain gauges the number of which is equal to the number of said third plurality, said fourth plurality of strain gauges being attached to and uniformly arranged about the periphery of said magnetostrictive element adjacent to and on the other side of said means for rigidly mounting to detect cross-sectional distortion of said magnetostrictive element, each of said strain gauges of said fourth plurality being positioned on a diagonal line passing through the major axis of said magnetostrictive element to a corresponding strain gauge of said third plurality.

12. A space sensing device as set forth in claim 11 wherein corresponding diagonally disposed strain gauges of said third and fourth pluralities are electrically connected in series and said means for providing an indication comprises:
  (a) a plurality of resistors equal in number to said third plurality of strain gauges, each of said resistors being electrically connected in series with one of the series connected strain gauge pairs and each of the series connected resistor and strain gauge pairs being electrically connected in parallel with a corresponding series connected resistor and strain gauge pair having diametrically opposed strain gauges to form Wheatstone bridges of which the resistive branches are connected at a first common junction and the strain gauge branches are connected at a second common junction, (b) a source of voltage connected across the junctions of said resistors and the series connected strain gauge pairs in the Wheatstone bridges, and (c) means for indicating the voltage unbalance across the first and second common junctions of said Wheatstone bridges.

13. A space sensing device as set forth in claim 12 wherein said source of voltage comprises an oscillator which provides an alternating voltage signal across the junctions of said resistors and the series connected strain gauge pairs in the Wheatstone bridges and wherein said means for indicating comprises:

(a) means connected across said first and second common junctions of said Wheatstone bridges for amplifying the voltage unbalance therebetween, (b) a phase sensitive demodulator connected to receive as inputs the output of said means for amplifying and a signal from said oscillator, and (c) means for providing a visual display of the output of said phase sensitive demodulator.

14. A three dimensional space sensing device comprising two identical space sensing devices as set forth in claim 11 positioned at right angles each to the other whereby all movements of said sensing device through three dimensional space are detected by said means for detecting.

References Cited by the Examiner

UNITED STATES PATENTS

| | | | |
|---|---|---|---|
| 2,309,853 | 2/43 | Lyman et al. | 33—204.3 |
| 2,455,939 | 12/48 | Meredith | 33—204.3 |
| 2,544,646 | 3/51 | Barnaby et al. | 73—505 |
| 2,627,400 | 2/53 | Lyman et al. | 73—505 |
| 2,683,247 | 7/54 | Wiley | 73—505 |
| 2,723,386 | 11/55 | Camp | 310—26 X |
| 2,878,006 | 3/59 | Sedgfield | 73—504 |
| 2,974,530 | 3/61 | Jacuen | 73—505 |
| 3,007,063 | 10/61 | Harris | 310—26 |
| 3,141,100 | 7/64 | Hart | 73—505 X |
| 3,143,889 | 8/64 | Simmons et al. | 73—505 |

JAMES J. GILL, *Examiner.*

RICHARD C. QUEISSER, *Primary Examiner.*